(12) United States Patent
Jain et al.

(10) Patent No.: US 8,238,474 B2
(45) Date of Patent: Aug. 7, 2012

(54) TRELLIS MODULATION PROTOCOLS FOR A VDSL SYSTEM

(75) Inventors: Raj Kumar Jain, Mandarin Gardens (SG); Sim Hak Keong, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 2190 days.

(21) Appl. No.: 11/073,001

(22) Filed: Mar. 4, 2005

(65) Prior Publication Data

US 2005/0201480 A1 Sep. 15, 2005

(30) Foreign Application Priority Data

Mar. 5, 2004 (SG) .............................. 200401383-5

(51) Int. Cl.
*H04L 27/36* (2006.01)
*H04L 5/12* (2006.01)
(52) U.S. Cl. ........................................ 375/298; 375/265
(58) Field of Classification Search ................... 375/222, 375/260, 261, 295–298, 135, 146, 219–220, 375/265, 267; 370/210, 468, 431, 464, 480; 704/242; 714/795
See application file for complete search history.

(56) References Cited

U.S. PATENT DOCUMENTS

| | | | | |
|---|---|---|---|---|
| 5,400,322 A * | 3/1995 | Hunt et al. | ...... | 370/468 |
| 6,549,512 B2 * | 4/2003 | Wu et al. | ...... | 370/210 |
| 6,650,658 B1 * | 11/2003 | Mueller et al. | ...... | 370/480 |
| 6,778,596 B1 * | 8/2004 | Tzannes | ...... | 375/222 |
| 6,829,297 B2 * | 12/2004 | Xia et al. | ...... | 375/232 |
| 6,980,601 B2 * | 12/2005 | Jones | ...... | 375/261 |
| 7,010,027 B1 * | 3/2006 | Mestdagh et al. | ...... | 375/222 |
| 7,072,387 B1 * | 7/2006 | Betts | ...... | 375/219 |
| 7,088,781 B2 * | 8/2006 | Betts | ...... | 375/260 |
| 7,151,794 B2 * | 12/2006 | Koifman et al. | ...... | 375/222 |
| 7,496,144 B2 * | 2/2009 | Jain | ...... | 375/260 |
| 7,599,447 B2 * | 10/2009 | Chan | ...... | 375/295 |
| 7,796,699 B2 * | 9/2010 | Jain et al. | ...... | 375/260 |
| 2002/0054610 A1 * | 5/2002 | Reusens et al. | ...... | 370/480 |
| 2002/0093989 A1 * | 7/2002 | Cioffi et al. | ...... | 370/509 |
| 2002/0101915 A1 * | 8/2002 | Zhang et al. | ...... | 375/222 |
| 2002/0122437 A1 * | 9/2002 | Cioffi et al. | ...... | 370/509 |
| 2002/0132455 A1 * | 9/2002 | Muramatsu et al. | ...... | 438/486 |
| 2002/0136320 A1 * | 9/2002 | Jin | ...... | 375/265 |
| 2002/0172146 A1 * | 11/2002 | Wu et al. | ...... | 370/208 |
| 2003/0018941 A1 * | 1/2003 | Miyata et al. | ...... | 714/780 |
| 2003/0026216 A1 * | 2/2003 | Mantilo | ...... | 370/293 |
| 2004/0032902 A1 * | 2/2004 | Koifman et al. | ...... | 375/222 |
| 2005/0046592 A1 * | 3/2005 | Cooper et al. | ...... | 340/855.7 |
| 2005/0111535 A1 * | 5/2005 | Saey | ...... | 375/222 |
| 2005/0195907 A1 * | 9/2005 | Jain | ...... | 375/260 |
| 2005/0281346 A1 * | 12/2005 | Redfern | ...... | 375/260 |

OTHER PUBLICATIONS

VDL1, ITU-T Standard VDSL1 "Very High Speed Digital Subscriber Line", pp. 5-7, 26-30, 106-107, 176-180.*
VDSL1, ITU-T Standard VDSL1 "Very High Speed Digital Subscriber Line", 2004, pp. 5-7, 26-30, 106-107, 176-180.*
Very High Speed Digital Subscriber Line Transceivers, Series G: Transmission Systems and Media, Digital Networks, Digital Sections and Digital Line System-Access Networks, Jun. 2004, ITU-T, Telecommunication Standardization Sector of ITU, G993.1, 1-228.*

* cited by examiner

*Primary Examiner* — Lawrence B Williams
(74) *Attorney, Agent, or Firm* — Slater & Matsil, L.L.P.

(57) ABSTRACT

A new protocol is proposed for transmission of data through lines such as telephone lines. The tones of a signal are grouped, and Trellis encoding is performed only of the members of a group. The computational cost of coding and decoding the data is reduced (compared to treating all the tones of a given direction equivalently), and the invention makes it possible to significantly reduce the computational and memory requirements of the encoder and decoder. Furthermore, Trellis decoding errors are not propagated between the groups.

24 Claims, 9 Drawing Sheets

TRELLIS MODULATION PROTOCOLS FOR A VDSL SYSTEM

This application claims priority to Singapore Patent Application 200401383-5, which was filed Mar. 5, 2004, and is incorporated herein by reference.

CROSS-REFERENCE TO RELATED APPLICATIONS

This application relates to the following and commonly assigned patent applications, all filed concurrently herewith: Ser. No. 11/073,000, now U.S. Pat. No. 7,496,144 B2, entitled "Allocating Data Between Tones in a VDSL System", Ser. No. 11/072,992, now abandoned, entitled "Computationally Efficient Protocols for VDSL System", and Ser. No. 11/071,987, now abandoned, entitled "VDSL Protocol with Low Power Mode", which applications are hereby incorporated herein by reference.

TECHNICAL FIELD

The present invention relates to methods for transmitting data, in particular over telephone lines (typically, copper telephone lines) or similar lines. It further relates to systems arranged to perform the methods.

BACKGROUND

The use of fast Internet connections has grown rapidly over the last few years, and consequently the demand for broadband (high-speed) connections is increasing.

One technology that is very well known in the market is Asymmetric Digital Subscriber Line (ADSL) technology. This employs the frequency spectrum indicated schematically in FIG. 1. "Upstream" communications (that is in the direction from the home or office user premises, "customer premises equipment" or "CPE", to the "central office", or "CO" or DSLAM, FTTC, or Fibre To The Curb, or FTTH, Fibre To The Home cabinets) are transmitted on frequencies in the range of 25 kHz (i.e., above the maximum audible frequency of 4 kHz) to 138 kHz. "Downstream" communications are in a higher frequency band from 138 kHz to an upper limit. According to the first two versions of ADSL (ADSL and ADSL2) the downstream band goes up to 1.1 MHz, whereas in ADSL2+ it goes up to 2.2 MHz. The upstream can be also extended from 0 khz up to 276 kHz, also known as All Digital Loop and extended upstream. Within each of the upstream and downstream bands, the range is divided into 4 kHz intervals, "tones," so that the downstream band includes 256 tones in ADSL and ADSL2 (which is capable of transmitting 8 MBps), and 512 tones in ADSL2+ (which is capable of transmitting 28 MBps). Each tone is encoded by quadrature amplitude modulation ("QAM"), and can encode between 0 and 15 bits. During a training phase, the line conditions (signal to noise ratio, SNR) of each of the tones is estimated, and the number of bits which will be encoded in each tone during each frame is selected.

In a typical ADSL modem, the main sections are (i) a Digital Interface (which may use asynchronous transfer mode (ATM)); (ii) a Framer (also referred to here as a framing unit); (iii) an DMT Modulator; (iv) the AFE (Analog Front End); and (v) a Line Driver.

The framer multiplexes serial data into frames, generates FEC (forward error correction), and interleaves data. FEC and data interleaving corrects for burst errors. This allows DMT-based ADSL technology to be suitable for support of MPEG-2 and other digital video compression techniques. For the transmit signal, an Encoder encodes frames to produce the constellation data for the DMT Modulator. It assigns the maximum number of bits per tone (based on measured SNR of each tone) and generates a QAM constellation where each point represents a digital value. Each constellation point is one of N complex numbers, x+iy, where x and y are the phase and amplitude components. The summation of bits in all carriers, multiplied by the frame rate (4 kHz), represents the data rate. For the receive signal, the decoder converts QAM symbols back into the data bitstream.

In the DMT Modulator, a frequency domain processor implements FFT/IFFT and associated processing. In the transmit path, the Inverse Fast Fourier Transform (IFFT) module accepts input as a vector of N QAM constellation points and duplicates each carrier with its conjugate counterpart so the 2N output samples are real. The 2N time domain samples may have for example the last 2N/16 samples appended as a cyclic extension (which may include a cyclic suffix, a windowing function and/or a cyclic prefix extension) for every symbol, and are then delivered to a DAC (digital-to-analog converter). The set of time domain samples represents a summation of all the modulated sub-channels, for the duration of one data frame. In the receive path, the first 2N/16 samples (cyclic prefix) from the ADC are removed from every symbol. A FFT module transforms the carriers back to phase and amplitude information (N complex QAM symbols). Correction for attenuation of the signal amplitude and phase shifts (i.e., overall distortion) is implemented. If the QAM constellation is thought of as points in a grid where rows and columns represent phase and amplitude information respectively, then the grid effectively rotates reference to the constellation points to correct for these distortions.

Based on the SNR, which has been established for the tones, they are classified based on the SNR such that a "path" is selected for each tone through the encoding device, and each of the tones is transmitted along to the framing unit through the corresponding selected transmission path. This is illustrated in FIG. 2(a), in which the framing unit 1 for producing V/ADSL frames receives data along two paths 2, 3. Each path 2, 3 leads to a respective block 4, 5, which constructs respective portions of frames. The frame is shown in FIG. 2(b), including a portion 6 generated by block 8, and a portion 7 constructed by a block 9 (which may be an interleaver). The outputs of the blocks 4, 5 are stored respectively in a fast buffer 8 and interleaved buffer 9, until they are transmitted out of the framing unit 1. Since the interleaver 5 interleaves data over a period of time, data transmitted along path 3 will have a different (higher) latency than data transmitted along the path 2. Thus, these two paths are referred to as different "latency paths" (e.g., they may be referred to as LP1 and LP2). Note that both paths LP1 and LP2 may be interleaved.

DMT technology also includes a feature known as "tone ordering". This means that the encoder, in forming VDSL symbols (there may be multiple VDSL frames within one VDSL symbol), determines the order in which subcarriers are assigned bits. The term tone ordering is wide enough to include both (i) determining the order in which the subcarriers are assigned data transmitted along a given latency path; and (ii) the order in which the subcarriers are assigned data transmitted along the different latency paths.

Furthermore, the number of bits that are transmitted by each of the tones may be modified if the estimated SNRs of the tones are revised: increasing the number of bits stored per frame in some tones and correspondingly reducing the number of bits stored per frame in other tones. There could be other reasons to dynamically change the bit allocation for spectral reasons too. This process is known as "bit swapping."

For further details of the ADSL2 standard, the reader is referred to the document ITU-T Recommendation G.992.3 published by the International Telecommunication Union, the disclosure of which is incorporated herein by reference in its entirety.

While ADSL provides Internet connections that are many times faster than a 56K modem, they still are not fast enough to support the integration of home services such as digital television and Video-on-Demand. However, another DSL technology known as very high bit-rate DSL (VDSL) is seen by many as the next step in providing a complete home-communications/entertainment package.

In contrast to ADSL, a conventional VDSL standard (here referred to as VDSL1) uses a number of bands, e.g. as shown in FIG. 3, which may go up to, for example, 12 MHz. Data rates are typically larger than those of ADSL, e.g., 8k samples per VDSL symbol for 4096 point-FFT. VDSL has a number of further differences from ADSL. For example, VDSL1 has different framing methods from ADSL2 (for example, with no sync symbol), it does not include Trellis encoding, and its interleaving system is different. In the ADSL2 system, the tone ordering is applied to all the tones used for communication in a given direction. Up until now, two sets of memories were required on a chip. If this feature is incorporated into future versions of VDSL, here referred to as VDSL2, with 4k tones or higher, each of the bit allocation table, gain tables, tone ordering tables each for 4k tones requires significant on-chip memory.

SUMMARY OF THE INVENTION

Embodiments of the present invention aim to provide new and useful protocols for transmitting data through lines such as telephone lines. Typically these protocols have transmission rates of over 24 Mbps, and often much higher.

Embodiments of the present invention propose in general terms that the tones of a signal are grouped, and that Trellis encoding is used to encode together the data that is to be transmitted on the tones of each group.

Implementations of the invention may offer two advantages (compared to treating all the tones of a given direction equivalently): (i) the computational cost of coding and decoding the data is reduced; and (ii) errors are not propagated between the groups (which may be subject to noise having different profiles), thereby potentially increasing the robustness of the system.

Furthermore, it can reduce the memory requirements of the encoder and decoder or provide an efficient implementation for high performance systems.

The groups may be defined in various ways within the scope of the invention.

A first possibility is for the groups to correspond to the bands (i.e., that all the consecutive tones that transmit information in a given direction are in the same group). A second related possibility is for there to be multiple groups within each of the bands, but such that all the tones of any given group are all within a single one of the bands.

A third possibility is for the groups to be selected irrespective of the bands, e.g., such that each group of tones are consecutive ones of the tones for transmitting data in a given direction. For example, the groups of upstream (downstream) tones may be consecutive, with some of the groups extending over more than one of the upstream (downstream) bands.

In any of these three possibilities, the groups may be predefined, i.e., as part of the protocol. However, this feature is not required by the invention, which may instead allow the groups to be defined based on the SNR ratios.

For example, a fourth possibility is for the groups to be defined based on the SNR ratios, but for the number of tones in each group to be limited. The Trellis encoding is performed only on the tones within each group. In one form of this possibility, for example, the tones of a given group may be selected from any of the tones associated with a given direction of communication (e.g., based on conventional tone ordering) but each group is limited to a maximum number of tones, and the tones of this group are Trellis encoded together. This too would help to ensure that errors are not propagated between the groups, depending on the noise profiles.

These various possibilities can be performed in combination. For example, a further way to select groups would be based on SNR ratios (as in the fourth possibility) but such that the tones of any given group are within only a single one of the bands (as in the second possibility).

In cases in which the groups are obtained as a part of the method (i.e., rather than being predefined), the definition of the groups may occur both in the training stage, and dynamic configuration changes.

In one of the related patent applications referenced above, we propose that groups of tones are also defined and used for tone ordering, bit swapping, selection of gains for each tone (e.g. gain scaling) and/or selection of paths for each tone. This idea is applicable both to the training stage, and to dynamic configuration changes. This concept is freely combinable with the present invention. One possibility is for the same groups that are used for Trellis encoding to be used to perform one or more of tone ordering, bit swapping, selection of gains for each tone and/or selection of paths for each tone. Alternatively, different groups can be used for the Trellis encoding from those which are used for any one or more of the other four schemes.

In another of the related patent applications referenced above, we propose that the transmission protocol includes at least two modes defined by respective band plans. Multiple modes may be useful when the volume of data that is to be transmitted is reduced, since it may permit a reduction in power consumption for example. In one form of this idea, at least a first band plan associated with a first of these modes employs a maximum frequency for data transmission, which is higher than the maximum frequency used for data transmission in a second band plan associated with a second of the modes.

Embodiments of the present invention are advantageously combinable with this idea, since in the case that the groups are defined (e.g., predefined) to include groups of low frequency and groups of relatively high frequency, the transition from one protocol to the other can be performed by simply ceasing to transmit data on a plurality of the high frequency groups of tones. (Note that this does not necessarily imply that nothing at all is transmitted on these high frequencies. Rather, there may still be a transmission of signals, but these signals do not include encoded data. They may for example be predefined, or essentially pseudo-random signals or PRBS signals. One reason for continuing to broadcast signals at these frequencies may be that ceasing to do so would itself change the noise environment.)

BRIEF DESCRIPTION OF THE DRAWINGS

Preferred features of the invention will now be described, for the sake of illustration only, with reference to the following figures in which.

DETAILED DESCRIPTION OF ILLUSTRATIVE EMBODIMENTS

Figure 4:
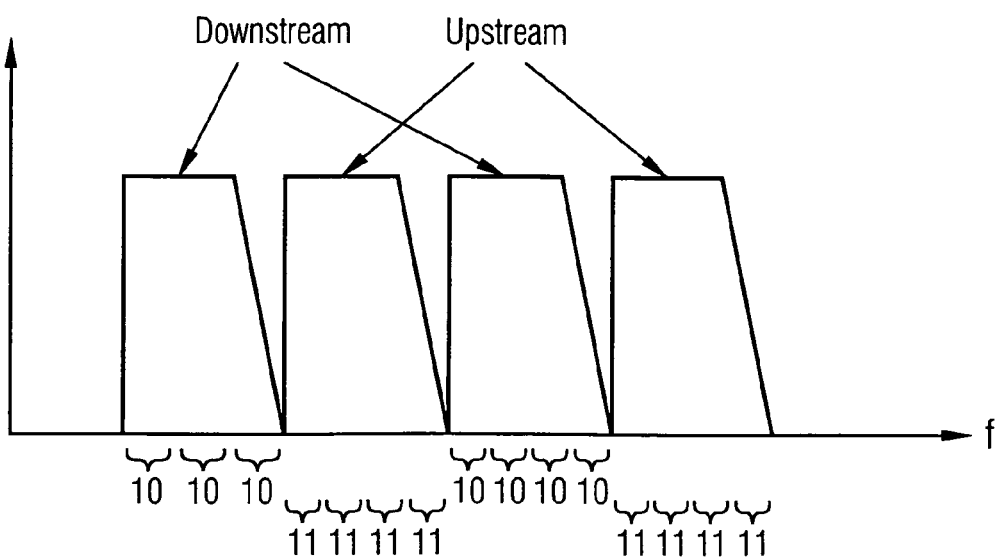
FIG. 4 shows a grouping of tones in a first embodiment of the invention.

Referring to FIG. 4, a schematic view is shown of bandwidth allocation in a protocol which is a first embodiment of the invention. Many features of the protocol, which are not described are generally according to the ADSL standard (which is described for example in the document ITU-T Recommendation G.992.3 published by the International Telecommunication Union, and is incorporated herein by reference). The first embodiment has the feature that in at least one, and more preferably both, of the upstream and downstream directions the tones are grouped into groups 10, 11 (all of the tones in any one group being associated with the same direction). In FIG. 4 the downstream groups are labelled 10 and the upstream groups 11. In particular the protocol defines a number of groups of tones and includes Trellis encoding performed on a group-by-group basis.

That is, Trellis encoding is used only to combine the N tones within the groups 10, 11. The decoding of such data is much cheaper computationally than if Trellis encoding is performed encoding together data which is to be placed in all the tones (as in ADSL). Thus, the computational cost of decoding the data is much reduced. For example, if the Trellis encoder employs four states in its algorithm, then decoding of the Trellis data can be performed in about 20 stages in a Viterbi decoder (that is, the number of states multiplied by a parameter which from statistical theory is known to be about 5). If the number of tones in each group is lower, then the computational task performed by each stage is less.

Figure 3:
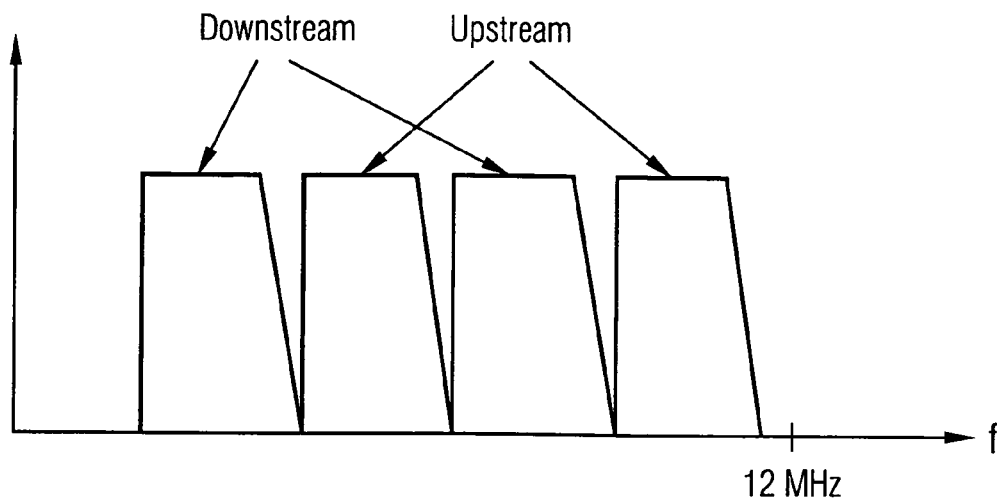
FIG. 3 shows the frequency usage of a conventional VDSL technique.

Generally speaking, in this first embodiment the upstream and downstream allocation of the bandwidth may be as in VDSL (i.e., as shown in FIG. 3), but within the scope of the invention any other allocation is also possible. Indeed one of the related applications referenced above discusses a novel allocation of the bandwidth into bands, and this too is suitable for use with the present invention.

In various versions of the first embodiment within the scope of the invention this grouping is done in various ways. A first possibility, for example, is to predetermine the number of tones in each group 10, 11 (e.g., such that all groups are the same number N of tones, such as 4 tones), and then to allocate tones to groups according to a simple scheme, for example such that the groups 10 are respective sets of N consecutive tones.

Figure 1:
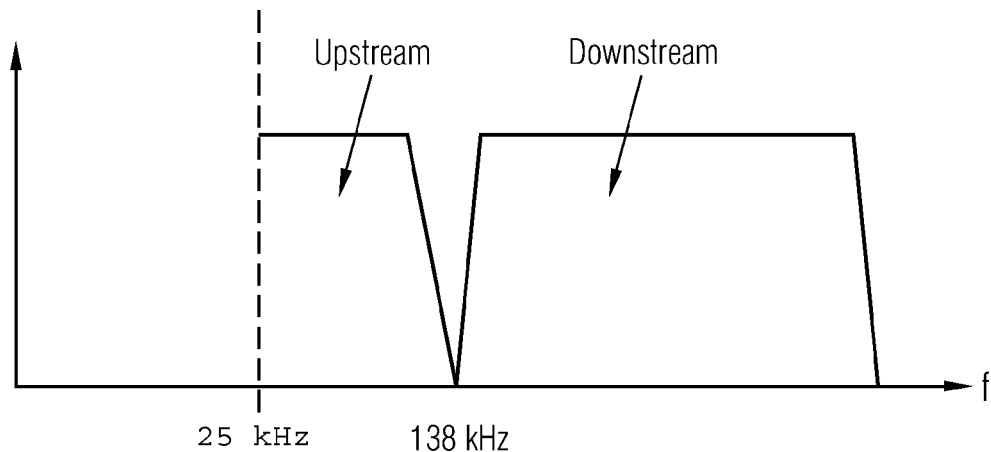
FIG. 1 shows the frequency usage of a conventional ADSL technique.
Figure 2A:
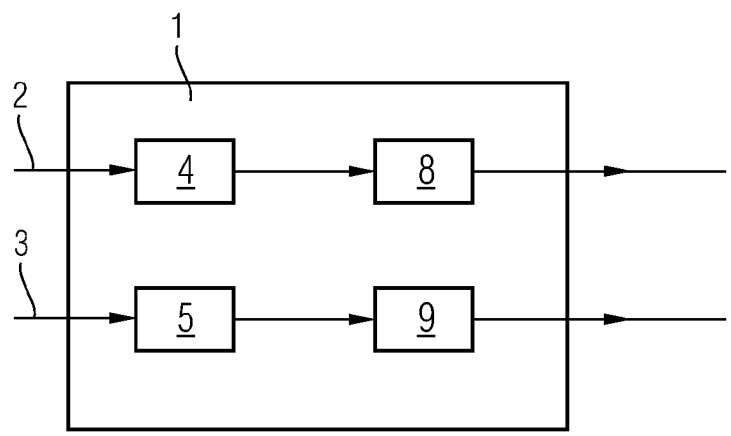
FIG. 2, which is composed of FIGS. 2(a) and 2(b), illustrates tone ordering in a conventional ADSL technique.
Figure 2B:
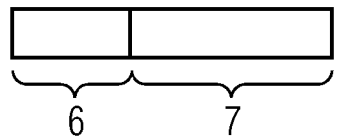

In the first embodiment of the invention, the groups are used for encoding the data. The operations of selecting the number of bits to be transmitted per tone, selection of the gains and/or selection of latency paths and/or bit swapping, are performed only in relation to the tones of single groups 10, 11. For example, within a certain group the SNR of each of the tones may be established during a training phase, and based on this SNR value a selection may be made of which of a plurality of paths each of the tones in the groups should be transmitted along. The plurality of paths preferably include two different latency paths, one with interleaving and other with or without interleaving. The two paths may, for example, be generated by a system as shown in FIG. 2(a). However, note that the invention is not limited in this respect, and in particular there may be more than two possible paths or even a single latency path.

FIG. 5 shows the downstream and upstream spectrum for VDSL1 services according to one form of this embodiment of the invention. In FIG. 5(a), the two upstream bands are shown as US1 and US2, while the two downstream bands are shown as DS1 and DS2. As shown respectively, in FIG. 5(b) and FIG. 5(c), it is proposed that each of the downstream and upstream frequency bands be further grouped in several groups $GD_1, \ldots GD_n$ and $GU_1, \ldots GU_m$, here n and m are respectively the number of groups for downstream and upstream transmission. It will be noted that GD3 is shown including tones from both DS1 and DS2, while GU3 is shown including tones from both US1 and US2. However, in other forms of the invention the groups may be defined such that each of groups is entirely within one of the bands (i.e., a given band may be partitioned into groups, e.g., such that each of the groups is a set of consecutive tones).

Figure 5A:
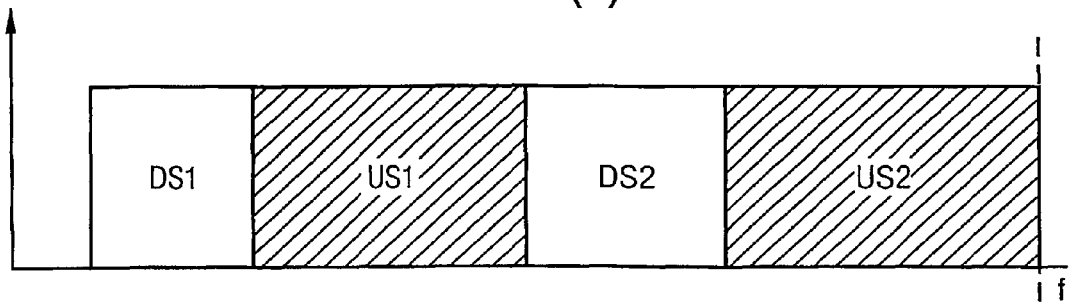
FIG. 5, which is composed of FIGS. 5(a) to 5(d), shows two specific examples of grouping the tones in embodiments of the invention.
Figure 5B:
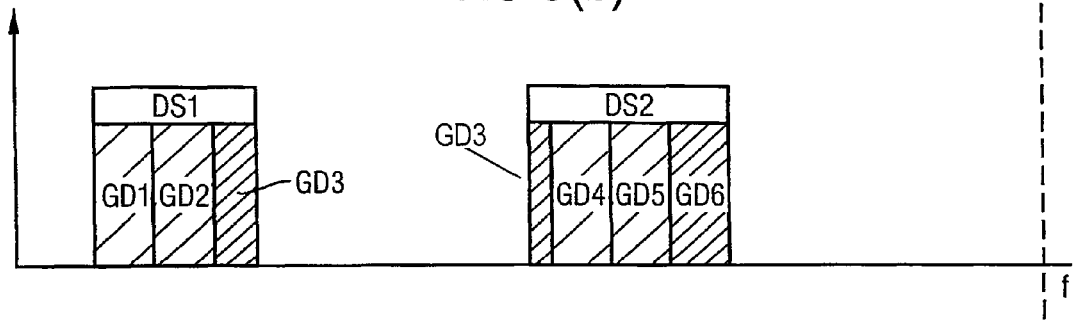
Figure 5C:
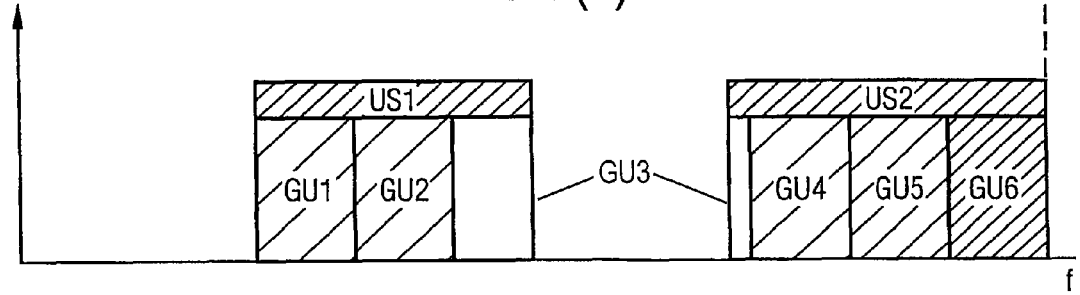
Figure 5D:
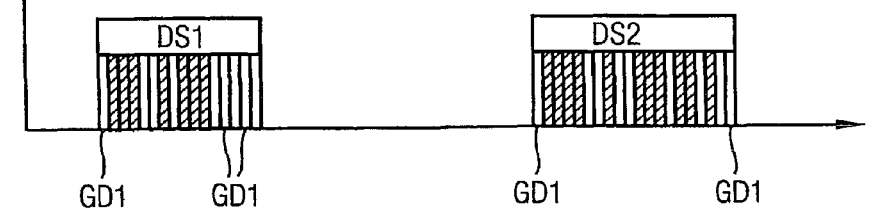

Alternatively, as shown in FIG. 5(d) (which shows, for the sake of example only, the downstream direction), the frequency tones within each of the groups may also span across the complete frequency spectrum, which could be more efficient for Trellis encoding and could be also dependent on the latency paths or tone ordering. In FIG. 5(d) areas with the same shading level represent tones within the same group. Thus, for example, the tones of FIG. 5(d) labeled $GD_1$ are the tones that together constitute the band $GD_1$.

It is also possible that the frequency bands DS1 be covered with a single Trellis group and DS2 with a second Trellis group and similarly for the upstream bands.

Figure 6A:
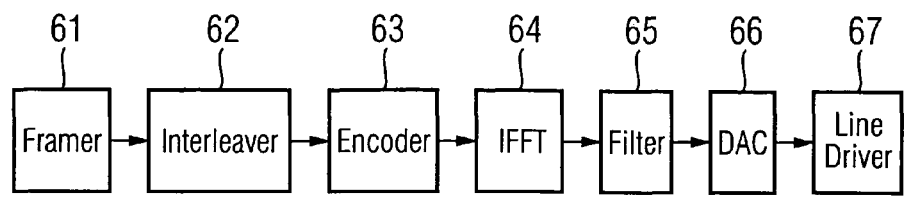
FIG. 6, which is composed of FIGS. 6(a) and 6(b), shows two possible structures of data transmission apparatus according to the embodiment.

FIG. 6(a) shows the structure of first transmission apparatus for use in generating the protocol as described above. It includes a framer unit 61, an interleaver 62, a QAM encoder 63 (which is where the Trellis modulation, bit allocation and tone ordering occur), an IFFT unit 64, a filter 65, a digital-to-analog converter 66 and a line driver 67. This structure is not new, although the operation of the encoder 63 (and optionally the interleaver 62) is different from known systems to produce the protocols of the invention.

The communication apparatus generally includes other elements, such as a quality determination unit for determining the SNR of each of the tones on the line (this unit may in principle be located outside the transmitter, such as at the other end of the telephone line, and arranged to transmit its results to the transmitter). Additionally, there is a processor for controlling the operation of one or more of the units shown in FIG. 6(a) (especially the encoder 63) on the basis of the output of the quality determination unit. In one embodiment the determination of how the tones of the group are modulated to encode the data includes a determination of which of at least two processing paths is used to encode data on each tone. In one embodiment the determination of how the tones of the group are modulated to encode the data includes determining for each tone of the group the respective proportion of the data to be carried by that tone.

Figure 6B:
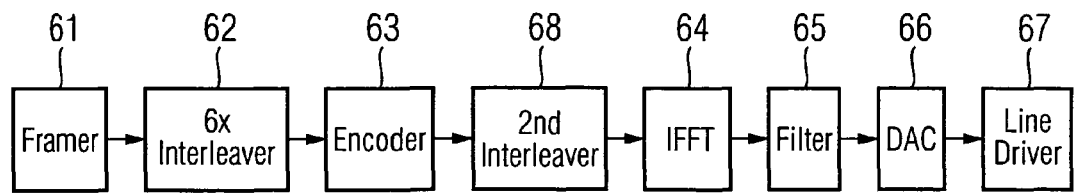

FIG. 6(b) shows the structure of a second transmission apparatus for use in generating the protocol as described above. In contrast to the structure of FIG. 6(a), in FIG. 6(b) there is an additional second interleaver 68 located after the QAM encoder 63. The purpose of the second interleaver 68 is to simplify the required operation and enhance the overall performance of the first interleaver 62 and the encoder 63 in the case that the grouping is a particularly complex one, such as the coding of FIG. 5(d).

Note that the interleaver(s) 62, 68 may be any of a convolutional interleaver, a triangular interleaver or a general convolutional interleaver (these terms are well-defined in this field).

As mentioned above, in certain versions of the embodiment, the groups are defined such that no group spans two bands (i.e., each group is entirely made up of tones that are all in a single band). This ensures that errors are not propagated from one band to another: decoding of such data limits the error propagation across all bands and provides the benefits of the DMT technology. At the same time, the decoding is much cheaper computationally than if Trellis encoding is performed encoding together data that is to be placed in all the tones (as in ADSL).

For example, each group may contain a maximum of 256 tones. The encoding in this case may be performed using a 4-dimensional 16-state Wie's encoder widely used in ADSL2 and shown in FIG. 7. Bits are encoded from input data labeled as "u" to form encoded data shown as "v" and "w." For example, bits for encoding on tone pairs $u_1$ and $u_2$ are input to a convolution encoder (finite state machine), the exact construction of which may be as shown in FIG. 8. For the encoding, two tone pairs are taken.

Figure 7:
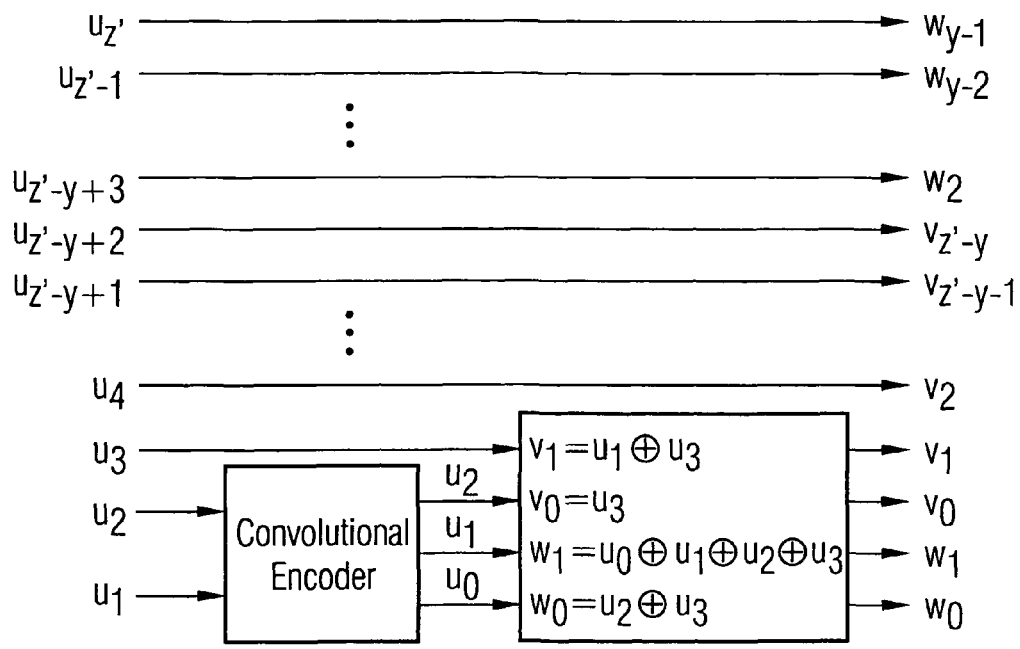
FIG. 7 shows a known Trellis encoder which may be used in an embodiment of the invention.
Figure 8:
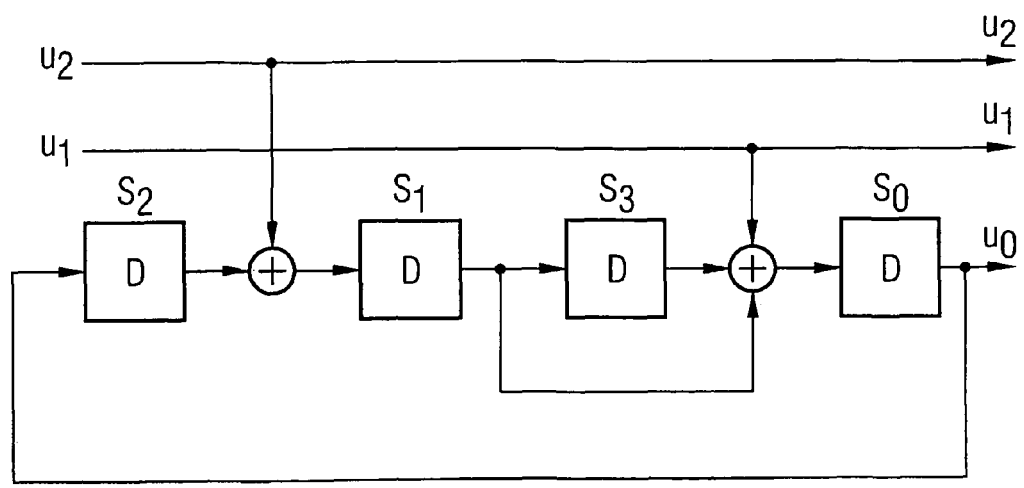
FIG. 8 shows a known convolutional encoder which may be used in an embodiment of the invention.
Figure 9:
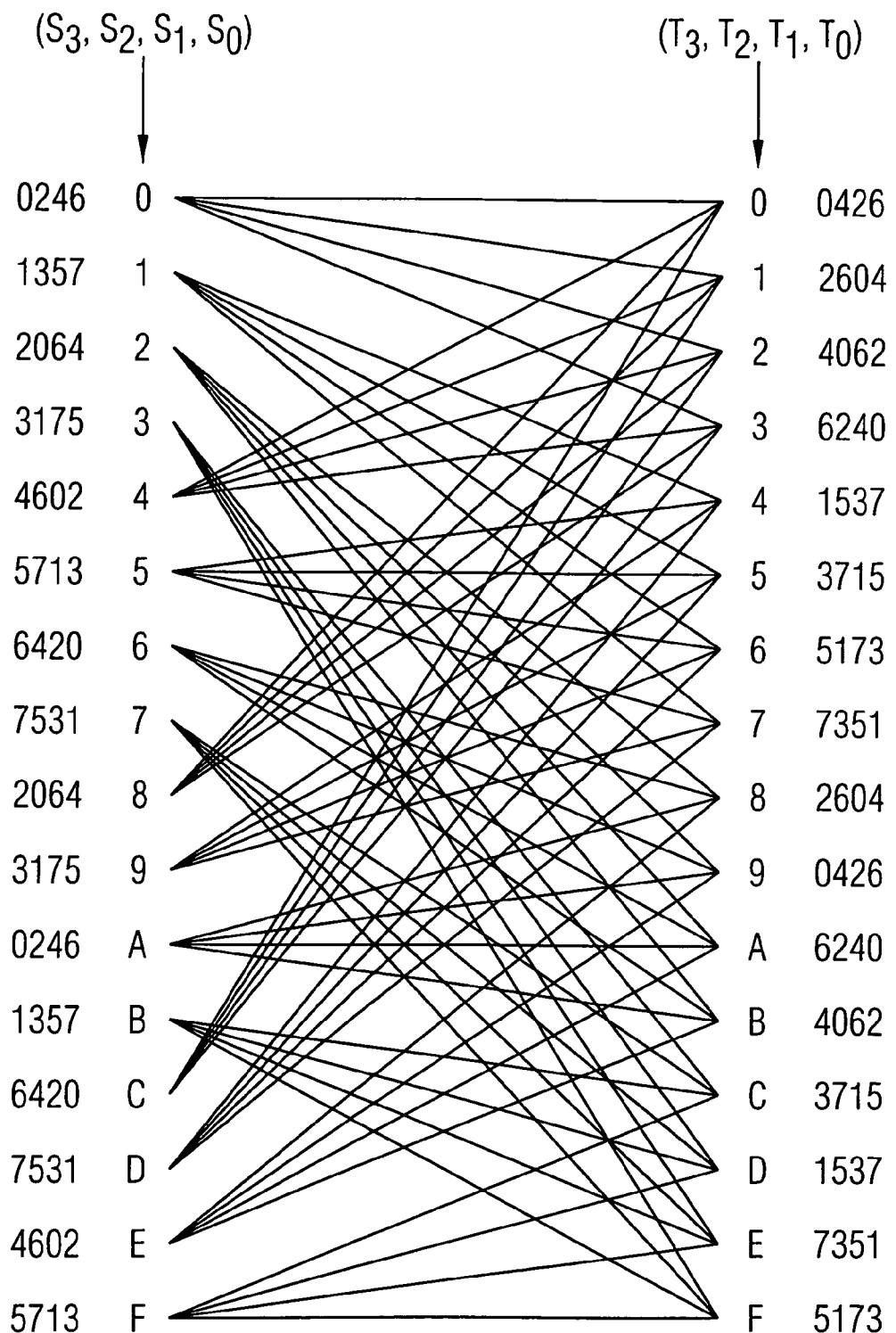
FIG. 9 is a known Trellis diagram.

FIG. 9 shows the Trellis diagram based on the finite state machine in FIG. 8, and the one-to-one correspondence between ($u_2$, $u_1$, $u_0$) and the 4-dimensional cosets. In FIG. 9, $S=(S_3, S_2, S_1, S_0)$ represents the current state, while $T=(T_3, T_2, T_1, T_0)$ represents the next state in the finite state machine. S is connected to T in the constellation diagram by a branch determined by the values of $u_2$ and $u_1$. The branch is labeled with the 4-dimensional coset specified by the values of $u_2$, $u_1$ (and $u_0=S_0$). To make the constellation diagram more readable, the indices of the 4-dimensional coset labels are listed next to the starting and end points of the branches, rather than on the branches themselves. The leftmost label corresponds to the uppermost branch for each state. The constellation diagram is also used when decoding the Trellis code by the Viterbi algorithm. For a fuller explanation of FIGS. 7 to 9 see section 8.6.2 of ADSL standard G992.3, where these diagrams appear.

Other types of encoder may also be used within the scope of the present invention. For example, block processing of Wei's 16-state 4-dimensional Trellis code may be supported to improve system performance. An algorithmic constellation encoder is used to construct constellations with a maximum number of bits defined in the standard. Data bits from the data frame buffer are extracted according to the bit allocation table $b'_i$, least significant bit first. Because of the 4-dimensional nature of the code, the extraction is based on pairs of consecutive $b'_i$, rather than on individual ones. Furthermore, due to the constellation expansion associated with coding, the bit allocation table $b'_i$ specifies the number of coded bits per sub-carrier, which can be any integer from 2 to 15. Trellis coding is performed on pairs of consecutive $b'_i$ values, ($x=b'_{2xi}$, $y=b'_{2xi+1}$), in the order i=0 to (NSC/2)−1. The value $b'_0$ is prepended to the reordered bit table $b'_i$ to make an integer number of pairs and is set to 0. Within each group in order to force the final state to the zero state (0, 0, 0, 0), the 2 LSBs $u_1$ and $u_2$ of the final two 4-dimensional symbols within the group of the DMT symbol are constrained to $u_1=S_1 \oplus S_3$, and $u_2=S_2$.

The last two 4-dimensional symbols in the DMT symbol are chosen to force the convolutional encoder state to the zero state. For each of these symbols, the 2 LSBs of u are predetermined, and only (x+y−3) bits are extracted from the data frame buffer and allocated to $t_3, t_4, \ldots, t_z$. The above requirements imply a minimum size of the $b'_i$ table of 4 non-zero entries. The minimum number of non-zero entries in the corresponding $b'_i$ table could be higher. Other types of the encoder could also be used.

As discussed above, in various embodiments of the present invention, the groups of the Trellis bands may be pre-defined, or defined (either at initialization, or subsequently at intervals (e.g., periodically)) based on some criterion, such as the SNR of one or more of the tones.

By limiting the span of the Trellis, and forcing the reset after a certain number of tones, the algorithm is made less computationally expensive while the Viterbi decoding is performed. This provision provides several advantages for the decoding process:

a) It helps to improve the overall performance of the system, reducing the error propagation only within certain groups of tones and frequency bands due to Trellis. Allows for encoding for selective tones and groups that may have more dominant noise environment. Inherently it makes the system very much independent of the complete frequency bands. It enhances the capabilities of the DMT system making it more robust and provides better noise correction capabilities.

b) It helps to reduce the dynamics of the path matrices, which is required to store while the decoding is performed. While performing the trace-back during the Viterbi decoding, depending on the number of states, the branch matrices are calculated and at each input the accumulated path matrices are calculated for a given state.

c) It helps to reduce the total memory requirements for the Viterbi decoder state memory storage. During the Viterbi decoding process, depending on the constraint length the survivor path, XY decode as well as the cumulated path matrices is required to be stored for decoding process depending on the constraint length.

d) This proposal also allows for parallel computations (encoding and/or decoding) across different bands.

As mentioned above, at least one of tone ordering (for selection of latency paths), bit allocation (i.e., selection of the number of bits to be transmitted on each tone), gain allocation and bit-swapping may be performed in relation to the same groups (e.g., neglecting the SNRs of all tones of other groups), such that a modulation scheme of the tones of the group is selected based on the transmission quality of the tones.

The tone ordering, bit allocation, gain allocation and bit swapping may be performed using many of the techniques known already for tone ordering etc., and reference is made in particular to the ADSL standard G992.3, and in particular FIGS. 7 and 8. These processes may treat all the tones equivalently (i.e., there is no grouping of the tones for these processes). Alternatively, any one or more of tone ordering, bit allocation, gain selection and bit swapping, may be carried out on a group-by group basis using groups defined in the same way as the groups defined above (or according to a different set of groups).

All these features are incorporated in the first embodiment. Assuming that the groups of the Trellis coding are as shown in FIGS. 5(b) and 5(c), or alternatively in FIG. 5(d), the tone ordering etc., may be performed using only the tones of the same groups used for Trellis encoding, with all the tones of the group transmitted using the same latency path.

For the online reconfiguration, for efficient implementation, one option is to limit the tone ordering process within a group for a single latency path. The bit-swap procedure should be limited to one group at one time. After the procedure is completed for one group, the bit swapping procedure is extended to the next group.

Optionally, as noted above, the Trellis bands may be limited to a single transmission band. This helps to smoothly transit to low power modes (as discussed below). During the low power modes (as described in detail below) the transmission could be restricted to only a few bands. Hence, if it is allowed to smoothly transit from one mode of transmission to another, it allows for smooth transition of the mode. In low power mode, the same set of tone ordering tables and bit gain tables could be used with the exception that the bands not used for transmission during the low power modes may not be used. The Trellis pairs also will not be affected and hence allows for seamless transition to low power mode. This mode of operation provides efficient implementation.

Figure 10A:
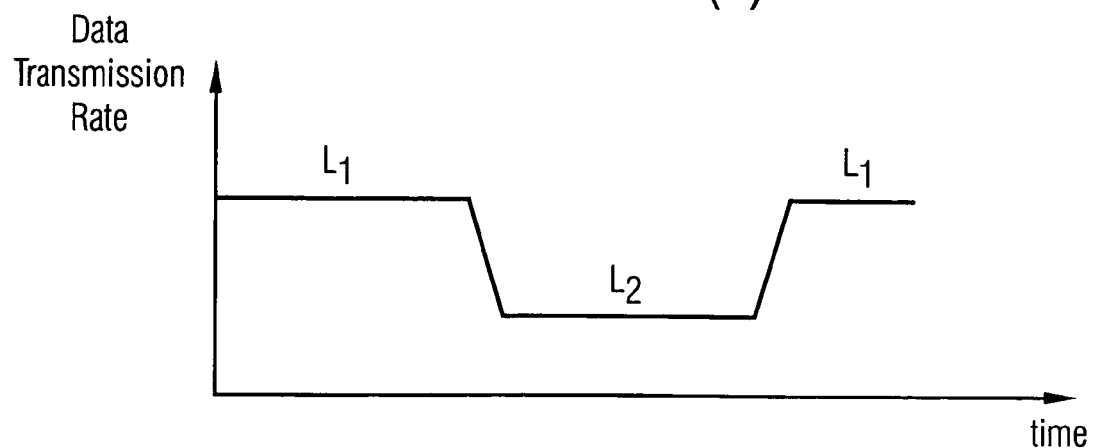
FIG. 10, which is composed of FIGS. 10(a) and 10(b), shows schematically the variation of data transmission rate in certain embodiments of the invention.

Some of the related patent applications referenced above describe systems in which the protocols permit a low power mode of operation, principally saving power consumption in the IFFT in the case of the encoder, or the FFT in the case of the decoder. This is illustrated in FIG. 10(a), which shows switching at different times between two modes $L_1$ and $L_2$. In these two modes the data transmission rate may be different.

Figure 10B:
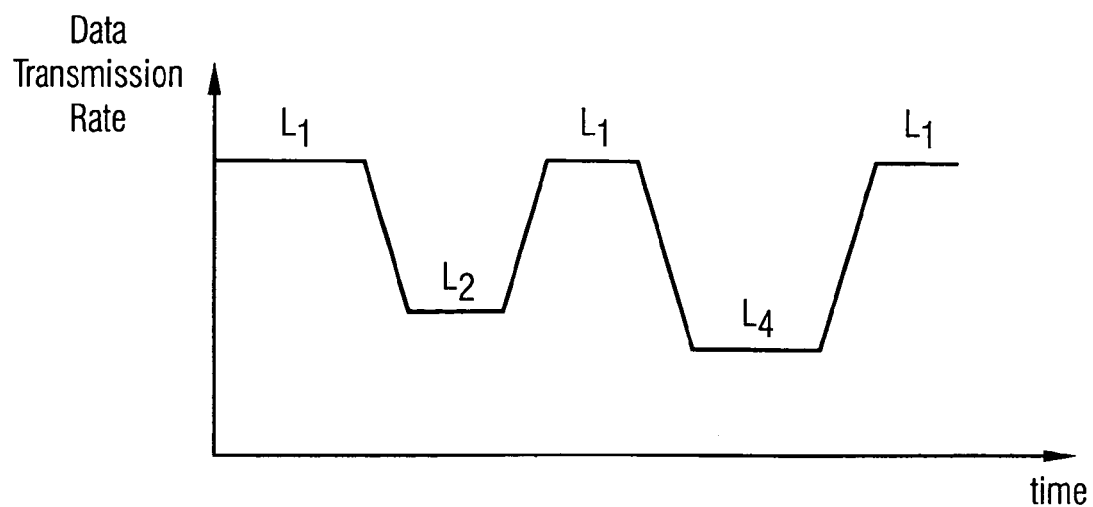

In fact, there may be a choice of different power saving modes. This is illustrated in FIG. 10(b) in which the protocol uses a first power saving mode $L_2$ at a first time, and a second power saving mode $L_4$ at other times.

FIG. 11 shows various specific band plans that can be produced in the various modes of operation explained in these related applications. FIG. 11(a) shows the full frequency range (up to 17 MHz) being used for transmitting data (i.e., the VDSL high power mode).

Figure 11A:
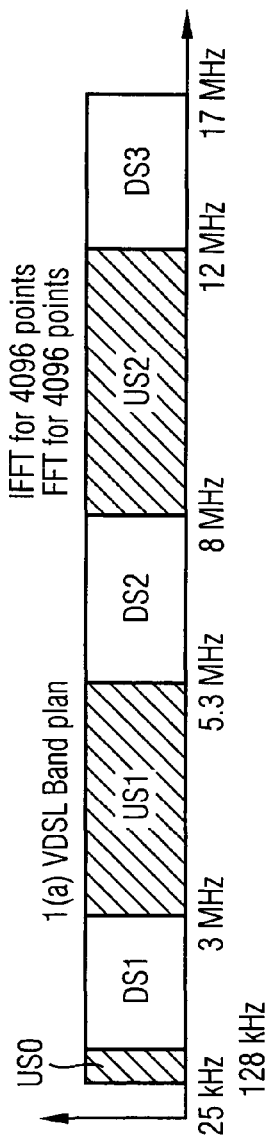
FIG. 11, which is composed of FIGS. 11(a) to 11(f), shows possible band plans in accordance with FIG. 10.
Figure 11B:
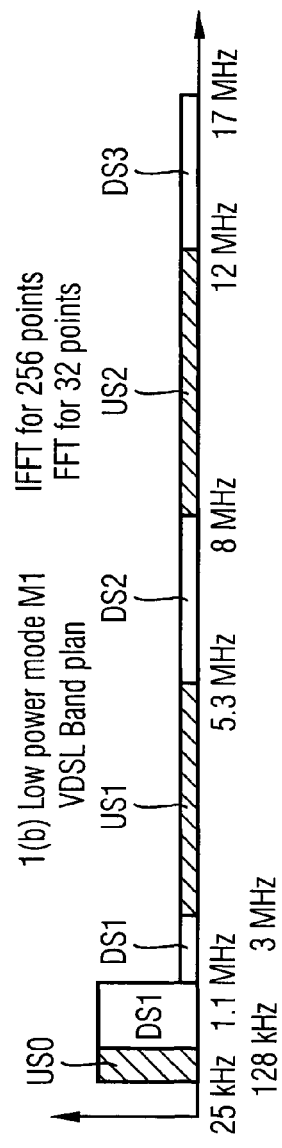

FIG. 11(b) shows a different mode of operation, in which only frequencies up to 1.1 MHz are used for transmitting data. Those frequencies above 1.1 MHz are shown with low values to indicate that no signal is transmitted on those frequencies, or (in other forms of the embodiments) that signals are transmitted that do not carry data. For example, it may be advantageous to broadcast signals that do not carry data on frequencies of 1.1 MHz to 17 MHz, to avoid changing the noise environment.

In yet further versions, the maximum transmission rate may be lower for the range of frequencies that are shown as having a low value. In other words, the range of frequencies (a "high frequency range") between 1.1 MHz and 17 MHz may be used to carry a certain data load in the first mode of operation, and a lower amount of data in the mode of FIG. 111(b).

Figure 11C:
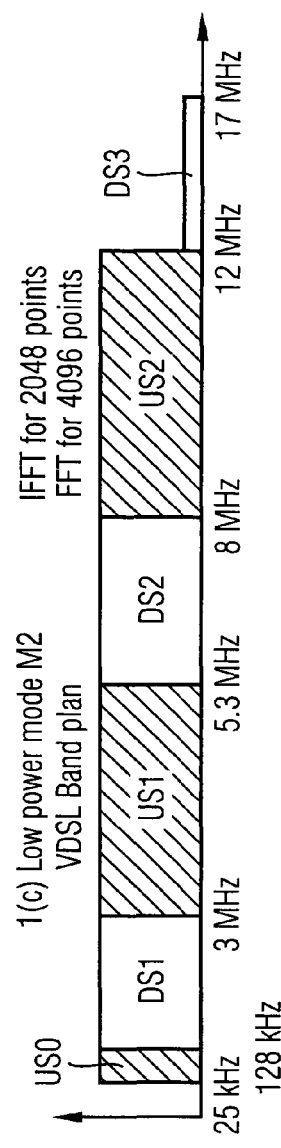

FIG. 11(c) shows a third mode of operation in which frequencies up to 12 MHz are used for transmitting data. Just as described above in relation to FIG. 11(a), the frequencies above 12 MHz, which are shown as "low" may be unused, used for non-data transmission, or used for data transmission at a lower data transmission rate than in FIG. 11(a).

Figure 11D:
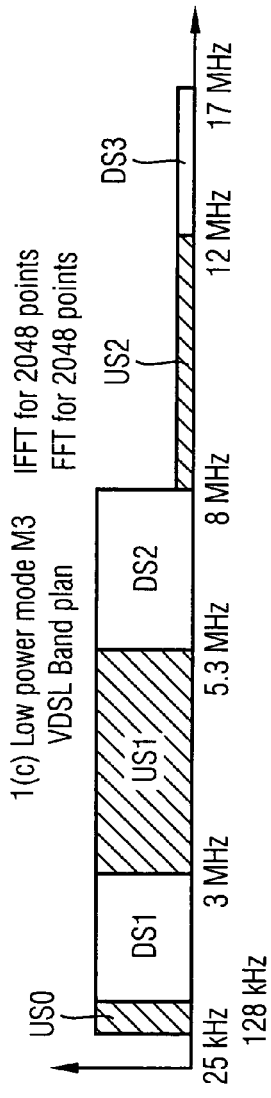

FIG. 11(d) shows a fourth mode of operation in which frequencies up to 8 MHz are used for transmitting data. Just as described above in relation to FIG. 11(a), the frequencies above 8 MHz, which are shown as "low" may be unused, used for non-data transmission, or used for data transmission at a lower data transmission rate than in FIG. 11(a).

Figure 11E:
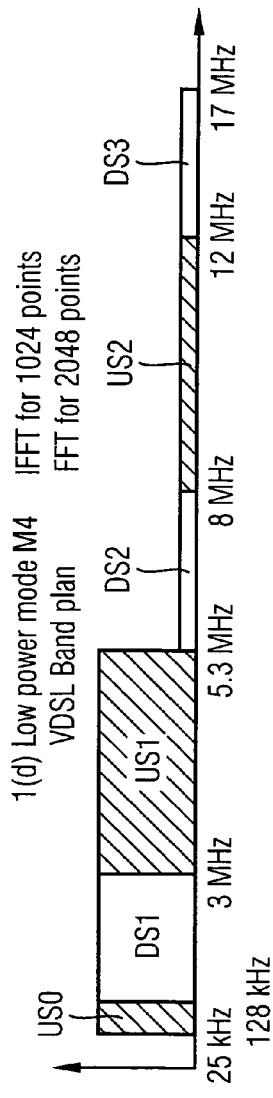

FIG. 11(e) shows a fifth mode of operation in which frequencies up to 5.3 MHz are used for transmitting data. Just as described above in relation to FIG. 11(a), the frequencies above 5.3 MHz, which are shown as "low" may be unused, used for non-data transmission, or used for data transmission at a lower data transmission rate than in FIG. 11(a).

Figure 11F:
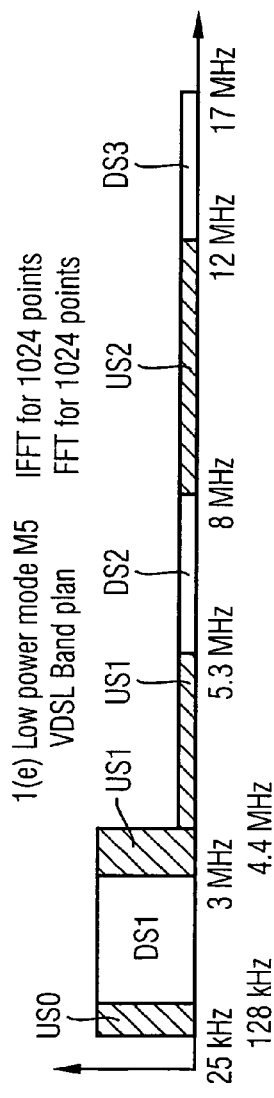

FIG. 11(f) shows a sixth mode of operation in which frequencies up to 4.4 MHz are used for transmitting data. Just as described above in relation to FIG. 11(a), the frequencies above 4.4 MHz, which are shown as "low" may be unused, used for non-data transmission, or used for data transmission at a lower data transmission rate than in FIG. 11(a).

These concepts are freely combinable with embodiments of the present invention. For example, in the case that the groups of the embodiment are defined (e.g., predefined) to include groups of low frequency and groups of relatively high frequency (i.e., all the tones of a high-frequency group are of higher frequency than all the tones of a low frequency group), the transition from one protocol to the other can be performed by ceasing to transmit data on one or more of the high frequency groups of tones (either ceasing to transmit a signal at all at the frequencies contained in the high-frequency groups, or continuing to transmit signals at those frequencies, but arranging that those signals do not include data). This combination is particularly suitable in the case that no groups include tones from more than one band.

During the low power modes the transmission may be restricted to only a few bands. Hence, if it is allowed to smoothly transit from one mode of transmission to another, it allows for smooth transition of the mode. In low power mode, the same set of tone ordering tables and bit gain tables could be used with the exception that the bands not used for transmission during the low power modes may not be used. The Trellis pairs also will not be affected and hence allows for seamless transition to low power mode. This mode of operation provides efficient implementation.

Although only a few embodiments of the invention have been disclosed in this application, many variations are possible within the scope of the invention as will be clear to a skilled reader. For example, the invention may be used when the modulation technique is other than one using an IFFT.

What is claimed is:

1. A communication apparatus to implement a process of two-directional communication of data over a transmission line, the communication employing a bandwidth partitioned into a number of bands and including at least one band associated with each of the two directions, the apparatus including:

a signal generation section for generating a signal by encoding the data carried in each direction by modulation of a plurality of tones defined within the at least one band associated with that direction, the tones being grouped into a plurality of groups of tones, each group of tones including a plurality of the tones, the signal generation section including:

an input section for receiving data;

an encoder for Trellis encoding together a portion of the data to be encoded by modulation of that group of tones; and a modulator for modulating the tones of the group using the respective portion of Trellis encoded data;

a signal transmission section for transmitting the generated signal, wherein each of the plurality of groups include tones from multiple bands;

a quality determination unit for deriving a measure of a quality of transmission of each of the tones; and a processor for determining for each group of tones, in dependence on said measure of the quality of the transmission for each of the tones of the group, a scheme for modulating the tones of the group to encode a respective portion of data associated with the group of tones, and for controlling the modulator in accordance with the determined modulation scheme.

2. The apparatus according to claim 1 wherein the quality determination unit is arranged at intervals to perform a re-determination of the measure of the quality of transmission of each of the tones of the group, and the modulator is arranged in accordance with the results of the re-determination to modify the way in which the tones of the group are modulated to encode subsequent data.

3. The apparatus according to claim 1 wherein said signal generation section includes at least two processing paths, the determination of how the tones of the group are modulated to encode the data including a determination of which processing path is used to encode data on each tone.

4. The apparatus according to claim 1 wherein said processor is arranged to determine for each tone of the group the respective proportion of the data to be carried by that tone.

5. The apparatus according to claim 1 wherein:

the quality determination unit is arranged to perform at intervals a re-determination of the measure of the quality of transmission of each of the tones of the group; and the processor is arranged, according to said re-determination of the transmission quality of the tones to modify the proportions of the data encoded using the respective tones.

6. The apparatus according to claim 1 wherein said processor is arranged to determine a respective gain for each of the tones.

7. The apparatus according to claim 1, wherein the signal transmission section comprises a line driver.

8. A method of two-directional communication of data over a transmission line, the communication employing a bandwidth partitioned into a number of bands and including at least one band associated with each of the two directions, the method including encoding the data carried in each direction by modulation of a plurality of tones defined within the at least one band associated with that direction, the tones being grouped into a plurality of groups of tones, each group of tones including a plurality of tones, the method including:

obtaining data, each portion of the data being associated with a group of tones;

separately Trellis encoding together each portion of data; and modulating the tones of the group using the respective portion of Trellis encoded data, wherein one or more of the groups include tones within at least two different respective bands.

9. The method according to claim 8 wherein each of the groups includes tones from multiple bands.

10. The method according to claim 8 further comprising performing a pre-processing step, in which the groups of tones are defined.

11. The method according to claim 8 further comprising deriving a measure of the quality of transmission of each of the tones wherein a relative quality of transmission of the tones of the group determines how the tones of that group are modulated to encode the data.

12. The method according to claim 11 further comprising re-determining the measure of the quality of transmission of each of the tones of the group and, in accordance with the results of the re-determination, modifying the way in which the tones of the group are modulated to encode subsequent data.

13. The method according to claim 11 wherein said determination of how the tones of the group are modulated to encode the data includes a determination of which of at least two processing paths is used to encode data on each tone.

14. The method according to claim 11 wherein said determination of how the tones of the group are modulated to encode the data includes determining for each tone of the group the respective proportion of the data to be carried by that tone.

15. The method according to claim 14 and further comprising:

re-determining the measure of the quality of transmission of each of the tones of the group; and according to said re-determination of the quality of transmission, modifying the proportions of the data encoded using the respective tones.

16. The method according to claim 11 wherein said determination of how the tones of the group are modulated to encode the data includes a determination of a respective gain for each of the tones.

17. The method according to claim 8 further comprising switching between a high data transmission rate mode and a low data transmission rate mode, the switching operation including ceasing to transmit data using one or more of said groups of tones.

18. A communication apparatus for use to implement a process of two-directional communication of data over a transmission line, the communication employing a bandwidth partitioned into a number of bands and including at least one band associated with each of the two directions, the apparatus including:

a signal generation section for generating a signal by encoding the data carried in each direction by modulation of a plurality of tones defined within the at least one band associated with that direction, the tones being grouped into a plurality of groups of tones, each group of tones including a plurality of the tones, the signal generation section including:

an input section for receiving data;

an encoder for Trellis encoding together a portion of the data to be encoded by modulation of that group of tones; and a modulator for modulating the tones of the group using the respective portion of Trellis encoded data; and a signal transmission section for transmitting the generated signal, wherein one or more of the groups include tones within at least two different respective bands.

19. The apparatus according to claim 18 wherein said signal generation section includes at least two processing paths, the determination of how the tones of the group are modulated to encode the data including a determination of which processing path is used to encode data on each tone.

20. The apparatus according to claim 18, wherein the signal transmission section comprises a line driver.

21. A method of two-directional communication of data over a transmission line, the communication employing a bandwidth partitioned into a number of bands and including at least one band associated with each of the two directions, the method including:

obtaining data, each portion of the data being associated with a group of tones, the group of tones include tones within at least two different respective bands;

separately Trellis encoding together each portion of data; and modulating the tones of the group using the respective portion of Trellis encoded.

22. The method according to claim 21 further comprising performing a pre-processing step in which the group of tone is defined.

23. The method according to claim 21 further comprising deriving a measure of a quality of transmission of each of the tones wherein the relative quality of transmission of the tones of the group determines how the tones of the group are modulated to encode the data.

24. The method according to claim 21 further comprising switching between a high data transmission rate mode and a low data transmission rate mode, the switching operation including ceasing to transmit data using the group of tones.

* * * * *